United States Patent
Deacon et al.

(10) Patent No.: US 7,210,071 B2
(45) Date of Patent: Apr. 24, 2007

(54) FAULT TRACING IN SYSTEMS WITH VIRTUALIZATION LAYERS

(75) Inventors: Peter John Deacon, Wimbourne (GB); Carlos Francisco Fuente, Portsmouth (GB); William James Scales, Fareham (GB); Barry Douglas Whyte, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 10/689,190

(22) Filed: Oct. 20, 2003

(65) Prior Publication Data
US 2004/0153833 A1 Aug. 5, 2004

(30) Foreign Application Priority Data
Nov. 22, 2002 (GB) .................. 0227250.8

(51) Int. Cl.
*G06F 11/00* (2006.01)
(52) U.S. Cl. .......................... 714/45; 714/25
(58) Field of Classification Search ................. 714/25, 714/35, 45, 34
See application file for complete search history.

(56) References Cited

U.S. PATENT DOCUMENTS

| | | | |
|---|---|---|---|
| 5,974,568 A * | 10/1999 | McQueen | 714/38 |
| 6,182,244 B1 * | 1/2001 | Bankemper et al. | 714/38 |
| 6,539,501 B1 * | 3/2003 | Edwards | 714/45 |
| 6,907,605 B1 * | 6/2005 | Ault et al. | 718/100 |
| 7,016,957 B2 * | 3/2006 | Morimoto et al. | 709/224 |
| 7,031,981 B1 * | 4/2006 | DeLuca et al. | 707/104.1 |
| 2002/0083371 A1 * | 6/2002 | Ramanathan et al. | 714/37 |
| 2004/0153833 A1 * | 8/2004 | Deacon et al. | 714/38 |
| 2004/0260787 A1 * | 12/2004 | Havulinna | 709/217 |
| 2005/0086664 A1 * | 4/2005 | Sundaresan et al. | 719/312 |
| 2005/0160431 A1 * | 7/2005 | Srivastava et al. | 719/313 |
| 2005/0278574 A1 * | 12/2005 | Kitamorn et al. | 714/34 |

FOREIGN PATENT DOCUMENTS

GB  2 276 255 A  9/1994

* cited by examiner

*Primary Examiner*—Scott Baderman
*Assistant Examiner*—Brian Assessor
(74) *Attorney, Agent, or Firm*—Robert M. Sullivan; Dillon & Yudell LLP

(57) ABSTRACT

In a stacked system, errors detected at a user application interface of one or more host systems are associated with root cause errors at a stack level below a virtualization layer by detecting an error at a user application interface; identifying an associated root cause error at a lower stack level; creating an error trace entry for the error; associating an error log identifier with the error trace entry; making the combined error log identifier and the error trace entry into an error identifier that is unique within the plurality of host systems in said stacked system; and communicating the error identifier to any requester of a service at a user application interface of one or more host systems when the service must be failed because of the root cause error.

2 Claims, 1 Drawing Sheet

ERROR LOG 170

| SEQUENCE # 210 | ERROR CODE 220 | ROOTCAUSE 230 |
|---|---|---|
|  |  |  |
| 527 | ABCDEF |  |
| 528 | ABCDEE | 527 |
| 529 | ABCDED | 527 |
| ⋮ |  |  |
| 653 | ABCCCC | 527 |
|  |  |  |

FAULT TRACING IN SYSTEMS WITH VIRTUALIZATION LAYERS

This application claims the priority of United Kingdom Patent Application No. 0227250.8, filed on Nov. 22, 2002, and entitled "Fault Tracing in Systems with Virtualization Layers."

BACKGROUND OF THE INVENTION

1. Technical Field

This invention relates to error tracing, and particularly to error tracing in environments having virtualization layers between host applications and devices.

2. Description of the Related Art

The problem of fault detection and isolation—tracking down a problem in a complex system to its root cause—is a very significant one. In some environments, there is simply a lack of any error reporting information, but in many enterprise-class environments, much effort is invested in raising and logging detected faults. In fault tolerant systems, such information is critical to ensuring continued fault tolerance. In the absence of effective fault detection and repair mechanisms, fault tolerant system will simply mask a problem until a further fault causes failure.

When a problem does arise, its impact is frequently hard to predict. For instance, in a storage controller subsystem, there are many components in the path or "stack" from disk drive to host application. It is difficult to relate actual detected and logged errors to the effect seen by an application or a user host system.

When many errors occur at the same time, it is particularly difficult to determine which of those errors led to a particular application failing. The brute force solution of fixing all reported errors might work, but a priority based scheme, fixing those errors that impacted the application that is most important to the business, would be more cost efficient, and would be of significant value to a system user.

Any lack of traceability also reduces the confidence that the right error has been fixed to solve any particular problem encountered by the user or the application.

Today's systems, with Redundant Array of Inexpensive Drives (RAID) arrays, advanced functions such as Flash Copy, and caches, already add considerable confusion to a top-down analysis (tracing a fault from application to component in system). It takes significant time and knowledge to select the root-cause error that has caused the fault.

With the introduction of virtualization layers in many systems, the problem is growing. Not only does virtualization add another layer of indirection, but many virtualization schemes allow dynamic movement of data in the underlying real subsystems, making it even more difficult to perform accurate fault tracing.

It is known, for example, from the teaching of U.S. Pat. No. 5,974,544, to maintain logical defect lists at the RAID controller level in storage systems using redundant arrays of inexpensive disks. However, systems using plural such arrays together with other peripheral devices, and especially when they form part of a storage area network (SAN), introduce layers of software having features such as virtualization that make it more difficult to trace errors from their external manifestations to their root causes.

There is thus a need for a method, system or computer program that will alleviate this problem, and it is to be preferred that the problem is alleviated at the least cost to the customer in money, in processing resource and in time.

SUMMARY OF THE INVENTION

The present invention accordingly provides, in a first aspect, a method in a stacked system for associating errors detected at a user application interface of one or more of a plurality of host systems with root cause errors at a stack level below a virtualization layer comprising the steps of detecting an error at a user application interface; identifying an associated root cause error at a lower stack level; creating an error trace entry for said error; associating an error log identifier with said error trace entry; making said combined error log identifier and said error trace entry into an error identifier that is unique within said plurality of host systems in said stacked system; and communicating said error identifier to any requester of a service at a user application interface of one or more of a plurality of host systems when said service must be failed because of said root cause error.

Preferably, the step of making said combined error log identifier and said error trace entry into an error identifier that is unique within said plurality of host systems in said stacked system comprises combining an error trace entry and an error log identifier with an integer value to make an error identifier that is unique within said plurality of host systems.

Preferably, the root cause error at a lower stack level is in a peripheral device of said stacked system.

Preferably, the peripheral device is a storage device.

Preferably, the stacked system comprises a storage area network.

The present invention provides, in a second aspect, an apparatus for associating errors detected at a user application interface of one or more of a plurality of host systems with root cause errors at a stack level below a virtualization layer comprising: an error detector for detecting an error at a user application interface; a diagnostic component for identifying an associated root cause error at a lower stack level; a trace component for creating an error trace entry for said error; an identifying component for associating an error log identifier with said error trace entry; a system-wide identification component for making said combined error log identifier and said error trace entry into an error identifier that is unique within said plurality of host systems in said stacked system; and a communication component for communicating said error identifier to any requester of a service at a user application interface of one or more of a plurality of host systems when said service must be failed because of said root cause error.

Preferably, the system-wide identification component for making said combined error log identifier and said error trace entry into an error identifier that is unique within said plurality of host systems in said stacked system comprises: a component for combining an error trace entry and an error log identifier with an integer value to make an error identifier that is unique within said plurality of host systems.

Preferably, the root cause error at a lower stack level is in a peripheral device of said stacked system.

Preferably, the peripheral device is a storage device.

Preferably, the stacked system comprises a storage area network.

The present invention further provides, in a third aspect, a computer program product tangibly embodied in a storage medium to, when loaded into a computer system and executed, cause said computer system to associate errors detected at a user application interface of one or more of a plurality of host systems with root cause errors at a stack level below a virtualization layer, said computer program product comprising computer program code means for detecting an error at a user application interface; identifying an associated root cause error at a lower stack level; creating an error trace entry for said error; associating an error log identifier with said error trace entry; making said combined error log identifier and said error trace entry into an error identifier that is unique within said plurality of host systems in said stacked system; and communicating said error identifier to any requester of a service at a user application interface of one or more of a plurality of host systems when said service must be failed because of said root cause error.

Preferred embodiments of the present invention for fault isolation in a virtualized storage subsystem in which errors are tagged with root cause information using unique error identifiers. This provides the advantage that multiple errors caused by a single fault in the system can quickly be diagnosed to the single fault. This speeds up the diagnostic procedure and reduces potential downtime in an otherwise highly available system.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, where:

DETAILED DESCRIPTION OF THE PREFERRED EMBODIMENT

Figures 1, 2:
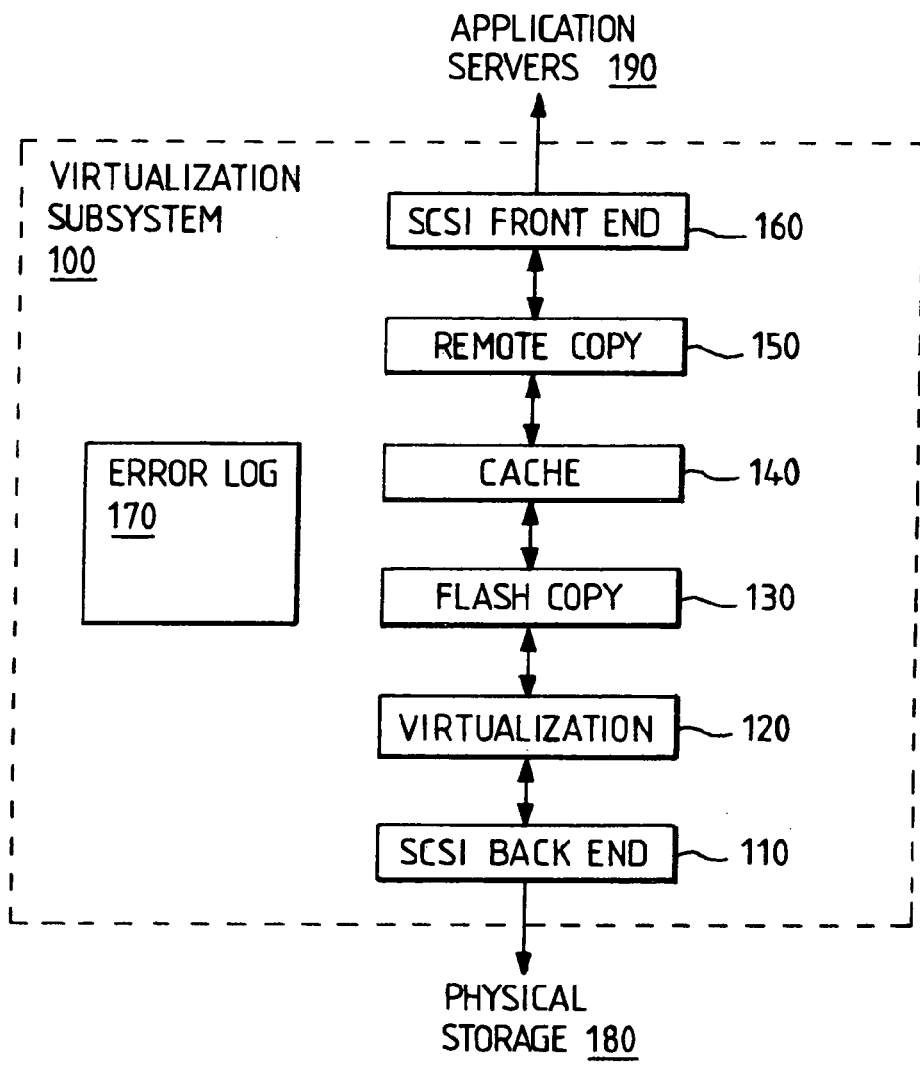
FIG. 1 shows an exemplary virtualization subsystem component stack.
FIG. 2 shows an example of an error log according to a presently preferred embodiment of the invention.

With reference now to FIG. 1, a preferred embodiment of the present invention uses an error log 170 that is preferably associated with an enterprise-class environment. Error log 170 is used to record faults that are detected by components in the system. These are typically the components that interface to the "outside world," such as network or driver layers, that are the first to detect and then handle an error.

Referring now to FIG. 2, a unique identifier 210 is added to the entries in error log 170. This can be done by using a large (for example, 32-bit) integer for each entry. The unique identifier 210, when qualified by the identifier of the log, identifies a particular event that might subsequently cause I/O service, or another activity, to fail. The error log 170 contains supplemental information detailing the fault detected using an error code 220, sufficient to allow a user or service personnel to repair the root-cause fault.

The unique identifier 210 is then used as part of the response to any service request (for example, an I/O request) that must be failed because of that error. The issuer of that request, on receipt of the failed response to its request, determines which, if any, of its own services or requests must be failed. It in turn fails its own requests, again citing the unique identifier that it initially received that identifies the cause of those failures.

Thus, the identity of the event causing failure is passed through the chain of failing requests, until it reaches the originator of each request. The originator then has the information required to determine exactly which error event must be repaired for each detected failure, expediting the repair process, and ensuring that the most critical applications are restored first. Further, there is a higher degree of confidence that the correct error has been repaired, avoiding the time delay and associated cost of unsuccessful recoveries.

In a preferred embodiment, the components that communicate the requests are layers in a software stack depicted as virtualization subsystem 100, performing functions such as managing RAID controllers or a similar Small Computer System Interface (SCSI) back end 110, virtualization 120, flash copy 130, caching 140, remote copy 150, and interfacing to host systems such as SCSI front end 160. The method of the preferred embodiment of the present invention allows for traceability through the system down the stack to the edges of the storage controller.

Each component in the software stack may itself raise an error as a result of the original failing event. As an example, a write operation from an application server 190 may be returned as a failure to the SCSI back end 110, that is, the write was failed by the physical storage for some reason. This results in an error being logged and a unique identifier 210 being returned to the raising component. The failed write is returned to the layer above, along with the unique identifier. These are returned up to virtualization subsystem 100. At each layer this may result in a failure within that component—for example if a flash copy is active against the disk that failed the write, the flash copy operation will be suspended and an error raised. This new error itself is assigned a unique identifier 210 and is marked with the unique identifier 210, or root cause 230, passed by the component below. The same may happen at each layer in the software stack. Eventually the initial error is returned as part of the SCSI sense data to the application server that requested the write.

The user can then relate the failed write operation down to the physical disk that failed the write, and the operations and functions that failed within the software stack—for example the flash copy operation described above.

It will be appreciated that the method described above will typically be carried out in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

It will be appreciated that various modifications to the embodiment described above will be apparent to a person of ordinary skill in the art.

What is claimed is:

1. A method comprising:
   associating an error log with an enterprise-class environment, wherein the error log records faults that are detected in a hierarchy of data storage operations in a computer system, and wherein the error log attributes a single root cause to faults in multiple data storage operations in the computer system;
   passing an identity of an event causing failure through a chain of failing requests until the identity of the event causing failure reaches an originator of a request for data from one or more of the hierarchy of data storage operations, wherein the chain of failing requests, which is caused by an error in a physical storage device, is promulgated through the hierarchy of data storage operations in an upward hierarchical manner from the physical storage device to the originator of the request for data;
   based on the identity of the event, determining, by the originator of the request for data, an error event and a storage device that must be repaired for each detected failure, wherein multiple errors, in the hierarchy of data storage operations, that are caused by a single fault are diagnosed to a single fault;
   adding a unique identifier to the error log, wherein the unique identifier identifies a particular event that is capable of causing an Input/Output service to fail in the hierarchy of data storage operations, and wherein the error log contains information that details a detected fault to enable service personnel to repair a root-cause of the detected fault;
   using the unique identifier as part of a message, to the originator of the request for data, indicating that a service must be failed due to the error, wherein the service is provided by a component in a virtualization subsystem, wherein the virtualization subsystem is a software stack that manages the hierarchy of data storage operations, wherein the hierarchy of data storage operations includes controlling a Redundant Array of Inexpensive Disks (RAID) storage device, virtualizing memory storage, flash copying of data, and caching of data;
   establishing a criticality order for applications that use data from the physical storage device; and
   in response to a fault in the physical storage device being repaired, restoring applications in order of criticality, wherein a most critical application is restored first.

2. A tangible computer readable medium on which are stored computer readable instructions that are configured for:
   associating an error log with an enterprise-class environment, wherein the error log records faults that are detected in a hierarchy of data storage operations in a computer system, and wherein the error log attributes a single root cause to faults in multiple data storage operations in the computer system;
   passing an identity of an event causing failure through a chain of failing requests until the identity of the event causing failure reaches an originator of a request for data from one or more of the hierarchy of data storage operations, wherein the chain of failing requests, which is caused by an error in a physical storage device, is promulgated though the hierarchy of data storage operations in an upward hierarchical manner from the physical storage device to the originator of the request for data;
   based on the identity of the event, determining, by the originator of the request for data, an error event and a storage device that must be repaired for each detected failure, wherein multiple errors, in the hierarchy of data storage operations, that are caused by a single fault are diagnosed to a single fault;
   adding a unique identifier to the error log, wherein the unique identifier identifies a particular event that is capable of causing an Input/Output service to fail in the hierarchy of data storage operations, and wherein the error log contains information that details a detected fault to enable service personnel to repair a root-cause of the detected fault;
   using the unique identifier as part of a message, to the originator of the request for data, indicating that a service must be failed due to the error, wherein the service is provided by a component in a virtualization subsystem, wherein the virtualization subsystem is a software stack that manages the hierarchy of data storage operations, wherein the hierarchy of data storage operations includes controlling a Redundant Array of Inexpensive Disks (RAID) storage device, virtualizing memory storage, flash copying of data, and caching of data;
   establishing a criticality order for applications that use data from the physical storage device; and
   in response to a fault in the physical storage device being repaired, restoring applications in order of criticality, wherein a most critical application is restored first.

\* \* \* \* \*